(12) United States Patent
Lawrence et al.

(10) Patent No.: US 6,523,950 B1
(45) Date of Patent: *Feb. 25, 2003

(54) INK JET PRINTING METHOD

(75) Inventors: Kristine B. Lawrence, Rochester, NY (US); Leslie Shuttleworth, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 186 days.

This patent is subject to a terminal disclaimer.

(21) Appl. No.: 09/721,191

(22) Filed: Nov. 21, 2000

(51) Int. Cl.$^7$ ................................................. B41M 5/00
(52) U.S. Cl. ....................................... 347/105; 428/195
(58) Field of Search ........................... 347/105; 428/195

(56) References Cited

U.S. PATENT DOCUMENTS 6,039,444 A * 3/2000 Mori et al. ................. 347/105
6,136,080 A * 10/2000 Evans et al. ................ 106/31.5
6,143,061 A   11/2000 Evans et al. ............. 106/31.48
6,206,517 B1 * 3/2001 Kovacs et al. .............. 347/101

* cited by examiner

*Primary Examiner*—Bruce H. Hess
(74) *Attorney, Agent, or Firm*—Harold E. Cole

(57) ABSTRACT

An ink jet printing method, comprising the steps of:
A) providing an ink jet printer that is responsive to digital data signals;
B) loading the printer with ink-receptive elements comprising a support having thereon an image-receiving layer comprising a mixture of an anionic polymer and a hydrophilic polymer;
C) loading the printer with an ink jet ink composition comprising water, a humectant, and a delocalized cationic azo dye derived from the quaternization of a nitrogen heterocyclic azo dye; and
D) printing on the image-receiving layer using the ink jet ink in response to the digital data signals.

17 Claims, No Drawings

INK JET PRINTING METHOD

CROSS REFERENCE TO RELATED APPLICATION

Reference is made to commonly assigned, co-pending U.S. patent application Ser. No. 09/643,789 by Shuttleworth et al., filed Aug. 22, 2000, entitled "Ink Jet Printing Method".

FIELD OF THE INVENTION

This invention relates to an ink jet ink printing method using an ink jet ink composition containing a quaternized nitrogen heterocyclic azo dye and a particular receiving layer.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc.

The choice of a colorant in ink jet systems is critical to image quality. For colors such as cyan, magenta, yellow, green, orange, etc., the peak wavelength (λ-max), the width of the absorption curve and the absence of secondary absorptions are important. The colorant should also have a high degree of light fastness after printing onto the ink-receiving element. For aqueous dye-based inks, the dye needs to be sufficiently soluble in water to prepare a solution that is capable of producing adequate density on the receiving element and stable for extended periods of storage without precipitation. High quality ink jet printing with dye-based inks requires dyes which will provide both bright hue and good light stability. It is difficult to find dyes which meet all of these requirements.

Another group of dyes is basic or cationic dyes which were developed mainly for the dyeing of synthetic textile fibers such as acrylics and acid-modified polyesters. These dyes are positively charged, due to either the incorporation of pendant, positively-charged substituent groups, such as tetraalkylammonium, or by virtue of the basic chromophore comprising a delocalized cationic system such as a cyanine, azacyanine or azo (diazacyanine).

U.S. Pat. No. 6,143,061 relates to the use of cationic azo dyes derived from the quaternization of pyrazoleazoaminothiazole dyes. As will be shown hereafter, these dyes have poor light stability and unwanted hue shifts in receiver elements containing various anionic polymers.

It is an object of this invention to provide an ink jet printing method using cationic dyes suitable for use in aqueous inks for ink jet printing that will provide more light stable images using certain receiver elements.

SUMMARY OF THE INVENTION

This and other objects are achieved in accordance with this invention which relates to an ink jet printing method, comprising the steps of:

A) providing an ink jet printer that is responsive to digital data signals;

B) loading the printer with ink-receptive elements comprising a support having thereon an image-receiving layer comprising a mixture of an anionic polymer and a hydrophilic polymer;

C) loading the printer with an ink jet ink composition comprising water, a humectant, and a delocalized cationic azo dye derived from the quaternization of a nitrogen heterocyclic azo dye; and D) printing on the image receiving layer using the ink jet ink in response to the digital data signals It has been found that use of the above dyes and image-receiving layer provides excellent hue characteristics and light stability.

DETAILED DESCRIPTION OF THE INVENTION

In a preferred embodiment of the invention, the cationic dye has the following formula:

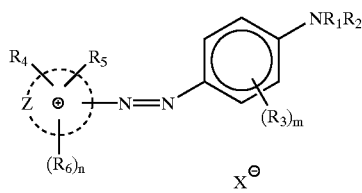

wherein:

Z represents the atoms necessary to complete a nitrogen-containing heterocyclic ring containing 2 or 3 nitrogen atoms and the balance carbon atoms;

$R_1$ and $R_2$ each independently represents hydrogen or a substituted or unsubstituted alkyl group of 1 to about 6 carbon atoms;

$R_4$, $R_5$ and $R_6$ each independently represents the same substituents as $R_1$ and $R_2$, halogen, cyano, substituted or unsubstituted alkoxy, acyl, benzoyl or alkoxycarbonyl; with the proviso that at least one of $R_4$, $R_5$ and $R_6$ represents a substituted or unsubstituted alkyl group of 1 to about 6 carbon atoms attached to a nitrogen atom;

$R_3$ represents the same groups as $R_4$, $R_5$ and $R_6$; hydroxy; a polyoxyalkylene group of 2–20 alkylene oxide residues; carboxy or sulfo or phospho ester; carbamoyl; substituted or unsubstituted alkyl-, aryl- aralkyl-, diaryl- or dialkyl-carbamoyl of 1 to about 20 carbon atoms; sulfamoyl; substituted or unsubstituted alkyl-, aryl-, aralkyl-, diaryl- or dialkyl-sulfamoyl of 1 to about 20 carbon atoms; acylamino; sulfonyl- amino; amino; a substituted or unsubstituted alkyl-, aryl-, aralkyl-, diaryl- or dialkylamino-of 1 to about 20 carbon atoms; or a quaternary ammonium or phosphonium group; or may be combined with $R_2$ to form a carbocyclic or heterocyclic 5 or 6 membered ring;

m is 1 to 4;

n is 1 except when Z represents the atoms necessary to complete a nitrogen-containing heterocyclic ring containing 3 nitrogen atoms, in which case n is 0; and X represents a counterion, such as citrate, gluconate or lactate; with the proviso that when Z represents the atoms necessary to complete a nitrogen-containing heterocyclic ring of 3 nitrogen atoms, then $R_3$ is combined with $R_2$ to form a carbocyclic or heterocyclic 5 or 6 membered ring.

Quaternized nitrogen heterocyclic-azo dyes are not new. They have been used for dyeing fabrics, particularly polyacrylonitrile fabrics. Typical examples are quaternized pyrazole-azo, imidazole-azo, triazole-azo dyes. Their use has been described for this purpose in "Chemistry and Application of Dyes" ed. D. R. Waring and G. Hallas, (Plenum Press), p184. A typical preparation of dyes of this type is also described in the above reference (p197).

Examples of dyes which can be used in the invention are as follows:

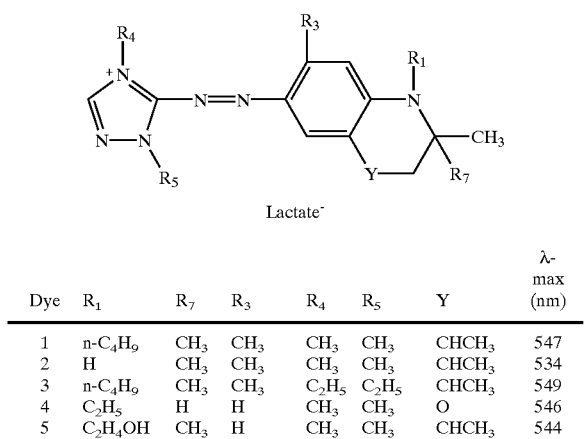

Lactate⁻

| Dye | $R_1$ | $R_7$ | $R_3$ | $R_4$ | $R_5$ | Y | λmax (nm) |
|---|---|---|---|---|---|---|---|
| 1 | n-$C_4H_9$ | $CH_3$ | $CH_3$ | $CH_3$ | $CH_3$ | $CHCH_3$ | 547 |
| 2 | H | $CH_3$ | $CH_3$ | $CH_3$ | $CH_3$ | $CHCH_3$ | 534 |
| 3 | n-$C_4H_9$ | $CH_3$ | $CH_3$ | $C_2H_5$ | $C_2H_5$ | $CHCH_3$ | 549 |
| 4 | $C_2H_5$ | H | H | $CH_3$ | $CH_3$ | O | 546 |
| 5 | $C_2H_4OH$ | $CH_3$ | H | $CH_3$ | $CH_3$ | $CHCH_3$ | 544 |

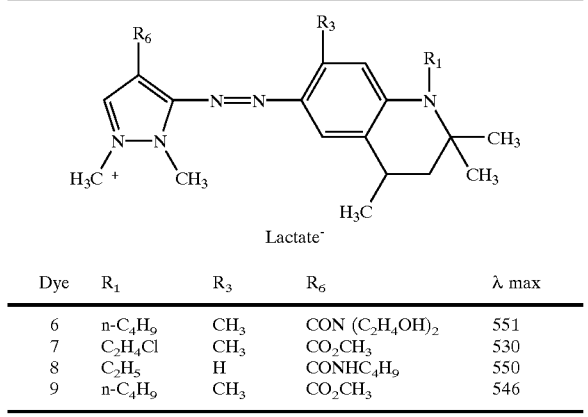

Lactate⁻

| Dye | $R_1$ | $R_3$ | $R_6$ | λ max |
|---|---|---|---|---|
| 6 | n-$C_4H_9$ | $CH_3$ | CON($C_2H_4OH$)$_2$ | 551 |
| 7 | $C_2H_4Cl$ | $CH_3$ | $CO_2CH_3$ | 530 |
| 8 | $C_2H_5$ | H | $CONHC_4H_9$ | 550 |
| 9 | n-$C_4H_9$ | $CH_3$ | $CO_2CH_3$ | 546 |

-continued

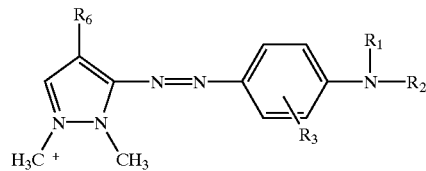

Lactate⁻

| Dye | $R_1$ | $R_2$ | $R_3$ | $R_6$ | λ max |
|---|---|---|---|---|---|
| 10 | $C_2H_5$ | $C_2H_5$ | H | CN | 550 |
| 11 | n-$C_3H_7$ | n-$C_3H_7$ | 3-NHCOCH$_3$ | $CO_2CH_3$ | 544 |
| 12 | $C_2H_5$ | $C_2H_5$ | 3-$CH_3$ | CN | 554 |

In a preferred embodiment of the invention, $R_1$ in the above formula represents hydrogen. In another preferred embodiment, $R_1$ represents n-$C_4H_9$. In still another preferred embodiment, $R_2$ and $R_3$ are taken together and represent a tetrahydroquinoline ring. In yet another preferred embodiment, $R_4$ represents CN or CON($C_2H_4OH$)$_2$. In still another preferred embodiment, $R_4$ and $R_5$ each represents $CH_3$. In another preferred embodiment, Z represents a triazole or pyrazole ring.

In general, the above dyes comprise from about 0.2 to about 5%, preferably from about 0.5 to 3%, by weight of the ink jet composition.

The water solubility of cationic dyes is significantly affected by the nature of the counterion X. The counterion preferred for solubility is often not readily incorporated during the synthesis. Ion exchange via ion exchange resins or dialysis/ultrafiltration or deprotonation and reprotonation with the desired acid counterion is often necessary to produce dyes having the preferred salt for high water solubility.

A humectant is employed in the ink jet composition employed in the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentane-diol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol monomethyl or mono-ethyl ether, triethylene glycol mono-methyl or mono-ethyl ether, diethylene glycol di-methyl or di-ethyl ether, and diethylene glycol monobutyl-ether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition employed in the invention is diethylene glycol, glycerol, or diethylene glycol monobutylether.

Water-miscible organic solvents may also be added to the aqueous ink employed in the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic.

A biocide may be added to the composition employed in the invention to suppress the growth of micro-organisms such as molds, fungi, etc. in aqueous inks. A preferred biocide for the ink composition employed in the present invention is Proxel® GXL (Zeneca Specialties Co.) at a final concentration of 0.0001–0.5 wt. %.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlene-diamine.

A typical ink composition employed in the invention may comprise, for example, the following substituents by weight: colorant (0.05–5%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink composition employed in the invention include thickeners, conductivity enhancing agents, anti-kogation agents, drying agents, and defoamers.

The ink jet inks employed in this invention may be employed in ink jet printing wherein liquid ink drops are applied in a controlled fashion to an ink receptive layer substrate, by ejecting ink droplets from a plurality of nozzles or orifices of the print head of an ink jet printer.

The image-receiving layers useful in this invention can contain anionic polymer classes derived from polyurethanes, polyesters, polyolefins or vinyl addition polymers. Examples of polymers useful for this invention include:

P-1: AQ55D® (Eastman Chemical Co.), poly[isophthalic acid-co-5-sodiosulfoisophthalic acid (82:18 molar ratio)-diethylene glycol-co-1,4-cyclohexanedimethanol (57:43 molar ratio)], Tg=55° C.

P-2: AQ38D® (Eastman /chemical Co.), poly[isophthalic acid-co-5-sodiosulfoisophthalic acid (89:11 molar ratio)-diethylene glycol-co-ethylene glycol (78:22 molar ratio)], Tg=38° C.

P-3: AQ29D® (Eastman Chemical Co.), poly[isophthalic acid-co-5-sodiosulfoisophthalic acid (90:10 molar ratio)-diethylene glycol 100 molar ratio)], Tg=29° C.

P-4: poly[isophthalic acid-co-5-sodiosulfoisophthalic acid (50:50 molar ratio)-diethylene glycol (100 molar ratio)], Tg=25° C.

P-5: poly[terephthalic acid-co-5-sodiosulfoisophthalic acid (50:50 molar ratio)-diethylene glycol (100 molar ratio)], Tg=47° C.

P-6: poly[5-sodiosulfoisophthalic acid (100 molar ratio)-diethylene glycol (100 molar ratio)], Tg=28° C.

P-7: AF 420 (Air Products Corp.) Tg=−20° C.
P-8: AF 421 (Air Products Corp.) Tg=0° C.
P-9: W-252 (Witco Corporation) Tg=−49° C.
P-10: W-234 (Witco Corporation) Tg=−28° C.
P-11: W-232 (Witco Corporation) Tg=−12° C.
P-12: W-320 (Witco Corporation) Tg=−12° C.
P-13: W-293 (Witco Corporation) Tg=−35° C.
P-14: F630 Flexthane® (Air Products Corp.)
P-15: High Density Polyethylene, PE260 (Chemcor Co.)
P-16: High Density Polyethylene, PE392LE30 (Chemcor Co.)
P-17: Polyethylene, PE40 (Chemcor Co.)
P-18: Ethylene-Acrylic Acid Copolymer ME4983R (Michelman Co.)
P-19: CP615NA (carboxylated styrene butadiene copolymer from Dow Chemical Company)
P-20: XU31066.50 (experimental polymer based on styrene butadiene copolymer from Dow Chemical Company)
P-21: poly(styrene-co-butyl methacrylate-co-2-sulfoethyl methacrylate sodium salt) 30:60:10 mole ratio
P-22: poly(styrene-co-butyl methacrylate-co-2-methylpropanesulfonic acid sodium salt) 30:60:10 mole ratio
P-23: poly(styrene-co-butyl methacrylate-co-acrylic acid sodium salt) 30:60:10 mole ratio
P-24: poly(styrene-co-butyl methacrylate-co-itaconic acid sodium salt) 30:60:10 mole ratio
P-25: poly(styrene-co-butyl methacrylate-co-aconitic acid sodium salt) 30:60:10 mole ratio
P-26: poly(acrylamide-co-2-methylpropanesulfonic acid sodium salt) 90:10 mole ratio
P-27: poly(acrylamide-co-2-methylpropanesulfonic acid sodium salt) 70:30 mole ratio
P-28: poly(acrylamide-co-2-methylpropanesulfonic acid sodium salt) 50:50 mole ratio
P-29: poly(acrylamide-co-styrenesulfonic acid sodium salt) 70:30 mole ratio
P-30: poly(acrylamide-co-styrenesulfonic acid sodium salt) 50:50 mole ratio
P-31: poly(acrylamide-co-styrenesulfonic acid sodium salt) 30:70 mole ratio
P-32: poly(acrylamide-co-styrenesulfonic acid sodium salt) 10:90 mole ratio
P-33: poly(acrylamide-co- acrylic acid sodium salt) 90:10 mole ratio
P-34: poly(styrene sulfonic acid sodium salt)

The anionic polymer employed in the invention may be used in an amount of from about 0.2 to about 26 g/m$^2$, preferably from about 1 to about 16 g/m$^2$.

Any hydrophilic polymer may be employed in the image-receiving layer used in the invention. For example, there may be used gelatin, such as pig skin deionized gel, (SKW Biosystems Co.) or polymers having the following formula:

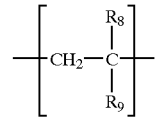

wherein:
  $R_8$ represents hydrogen or an alkyl group having from about 1 to about 6 carbon atoms; and
  $R_9$ represents hydroxyl, pyrrolidone, NHCOR$_{10}$ or CONHR$_{10}$, where R$_{10}$ represents an alkyl group having from about 1 to about 6 carbon atoms.

Examples of the above hydrophilic polymer include polyvinyl alcohol, polyvinyl pyrrolidone, poly(ethyl oxazoline), non-deionized or deionized Type IV bone gelatin, acid processed ossein gelatin or pig skin gelatin. The hydrophilic polymer may be present in an amount of from about 0.4 to about 30 g/m$^2$, preferably from about 1 to about 16 g/m$^2$.

In a preferred embodiment of the invention, the weight ratio of anionic polymer to hydrophilic polymer is from about 1:9 to about 8:2, preferably from about 1 to about 1.

The following example illustrates the utility of the present invention.

EXAMPLE

Example 1

Synthesis of Dye 1 (Structure Above)

a) 3-Amino-1,2,4-triazole (7.56 g)(0.09 m) was dissolved in a mixture of sulfuric acid (9.9 ml) and water (36 ml) at 25° C. Acetic acid (36 ml) was added and the mixture cooled to 0–5° C. Then, 5M sodium nitrite solution (from 7 g $NaNO_2$ in 20 ml $H_2$) was added slowly keeping the temperature <5° C. The mixture was stirred at this temperature for 3 hours, and then excess nitrite was decomposed by addition of a 10% solution of sulfamic acid.

The diazo solution was added to a solution of the coupler, N-butyl-2,2,4,7-tetramethyl tetrahydroquinoline, (22 g) (0.09 m) in acetic acid (75 ml). The mixture was neutralized with sodium acetate and ice, gradually, and finally diluted with ice-water. An oil was formed which solidified overnight at 21° C. The dye was filtered, washed with water and dried. The yield was 23.3 g (76%).

b) The above dye (16.8 g)(0.05 m) was dissolved in acetic acid (300 ml) and magnesium oxide (5.25 g) added. The mixture was heated to 70° C. and dimethyl sulfate (30 ml) was added. Heating was continued at 80–90° C. for 3 hours, and the mixture was then drowned into water (ca 1.5l). The solution was filtered through celite, and sodium perchlorate (30 g), in a little water was added to the filtrate slowly with stirring. The dye was filtered washed with water and dried. The yield was 18 g (77.8%)

c) The dye was converted to its lactate form by stirring 1 g of perchlorate dye in 20 ml water with 4 g of lactate ion exchange resin (previously prepared from Amberjet® 4200 (Cl) resin, and flooding with sodium lactate solution). The mixture was stirred at 60–70° C. for 2–3 hours, cooled to 21° C. and filtered. The filtrate was used directly as a dye concentrate to prepare the ink jet ink

Example 2

Preparation of Invention Ink I-1

Ink containing Dye 1 was prepared by mixing an appropriate amount of the dye concentrate prepared as above with de-ionized water containing humectants of diethylene glycol and glycerol, each at 8%, a biocide, Proxel GXL® at 0.003 wt % and a surfactant, Surfynol 465® (Air Products Co.) at 0.5 wt. %.

The dye concentration was based on solution absorption spectra and chosen such that the final ink when diluted 1:1000, would yield a transmission optical density of approximately 1.0.

Example 3

Preparation of Control Ink CI-1

Ink containing the control dye CD-1, structure below, was prepared as above except the electrically neutral form of the dye (0.9%) was dissolved in lactic acid (Aldrich Chemical Co.) at 0.7% in a given volume of filtered deionized water followed by the addition of a stock solution containing glycerol (Acros Co.) and diethylene glycol (Aldrich Chemical Co.) each at 6%, a biocide, Proxel GXL® at 0.003 wt % and a surfactant, Surfynol 465® (Air Products Co.) at 0.25 wt. %.

CD-1:

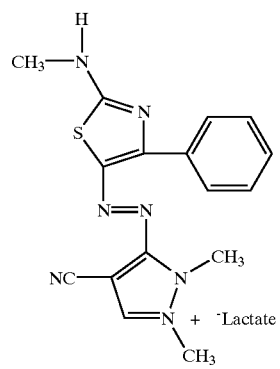

Example 4

Preparation of Receiver Elements E-1 through E-34

The composite side of a polyethylene resin coated photographic grade paper based support was corona discharge treated prior to coating. Ink receptive layers were composed of a mixture of 4.31 $g/m^2$ of anionic polymer P-1 through P-34 (shown above), 4.31 $g/m^2$ of pigskin gelatin (SKW Biosystems Co.) and 0.09 $g/m^2$ of S-100 20 µm polystyrene beads (ACE Chemical Co.), and coated from distilled water on the above mentioned paper support.

Example 5

Printing of Test Images

Elements E-1 through E-34 were printed using an Epson 200 ® printer using I-1 and Cl-1 inks described in Examples 2 and 3 respectively. After printing, all images were allowed to dry at room temperature overnight, and the densities were measured at all steps using an X-Rite 820® densitometer. The images were then subjected to a high intensity daylight fading test for 1 week, 50Klux, 5400° K., approximately 25% RH. The Status A green reflection density nearest to 1.0 was compared before and after fade and a percent density retained was calculated for the magenta dyes with each receiver element. The results can be found in Table 1 below.

TABLE 1

| Receiver Element | Polymer ID | % Density Retained for I-1 ink | % Density Retained for CI-1 ink | Hue Shifts With CI-1 Ink |
|---|---|---|---|---|
| E-1 | P-1 | 87 | 83 | |
| E-2 | P-2 | 93 | 82 | |
| E-3 | P-3 | 93 | 72 | |
| E-4 | P-4 | 95 | 76 | |
| E-5 | P-5 | 99 | 76 | |
| E-6 | P-6 | 76 | 62 | |
| E-7 | P-7 | 75 | 52 | Copper brown |
| E-8 | P-8 | 99 | 49 | Reddish brown |
| E-9 | P-9 | 70 | 6 | |
| E-10 | P-10 | 72 | 15 | |
| E-11 | P-11 | 83 | 42 | |
| E-12 | P-12 | 70 | 19 | |
| E-13 | P-13 | 68 | 30 | |
| E-14 | P-14 | 77 | 30 | |
| E-15 | P-15 | 37 | 28 | |
| E-16 | P-16 | 52 | 41 | |
| E-17 | P-17 | 60 | 27 | Copper brown |
| E-18 | P-18 | 49 | 10 | |
| E-19 | P-19 | 38 | 13 | |

TABLE 1-continued

| Receiver Element | Polymer ID | % Density Retained for I-1 ink | % Density Retained for CI-1 ink | Hue Shifts With CI-1 Ink |
|---|---|---|---|---|
| E-20 | P-20 | 38 | 25 | |
| E-21 | P-21 | 76 | 51 | Reddish brown |
| E-22 | P-22 | 71 | 61 | Reddish brown |
| E-23 | P-23 | 64 | 36 | |
| E-24 | P-24 | 67 | 41 | Reddish brown |
| E-25 | P-25 | 65 | 58 | |
| E-26 | P-26 | 72 | 59 | |
| E-27 | P-27 | 75 | 56 | |
| E-28 | P-28 | 77 | 65 | |
| E-29 | P-29 | 81 | 63 | |
| E-30 | P-30 | 88 | 67 | |
| E-31 | P-31 | 83 | 67 | |
| E-32 | P-32 | 84 | 68 | |
| E-33 | P-33 | 68 | 42 | |
| E-34 | P-34 | 79 | 68 | |

The above results show that the ink employed in the invention gave better light stability with no hue shifts relative to the ink of the prior art.

The invention has been described in detail with particular reference to certain preferred embodiments thereof, but it will be understood that variations and modifications can be effected within the spirit and scope of the invention.

What is claimed is:

1. An ink jet printing method, comprising the steps of:
   A) providing an ink jet printer that is responsive to digital data signals;
   B) loading said printer with ink-receptive elements comprising a support having thereon an image-receiving layer comprising a mixture of an anionic polymer and a hydrophilic polymer;
   C) loading said printer with an ink jet ink composition comprising water, a humectant, and a delocalized cationic azo dye derived from the quaternization of a nitrogen heterocyclic azo dye; and
   D) printing on said image-receiving layer using said ink jet ink in response to said digital data signals.

2. The method of claim 1 wherein said cationic dye has the following formula:

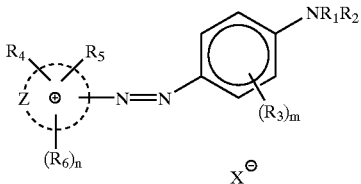

wherein:
   Z represents the atoms necessary to complete a nitrogen-containing heterocyclic ring containing 2 or 3 nitrogen atoms and the balance carbon atoms;
   $R_1$ and $R_2$ each independently represents hydrogen or a substituted or unsubstituted alkyl group of 1 to about 6 carbon atoms;
   $R_4$, $R_5$ and $R_6$ each independently represents the same substituents as $R_1$ and $R_2$, halogen, cyano, substituted or unsubstituted alkoxy, acyl, benzoyl or alkoxycarbonyl; with the proviso that at least one of $R_4$, $R_5$ and $R_6$ represents a substituted or unsubstituted alkyl group of 1 to about 6 carbon atoms attached to a nitrogen atom;
   $R_3$ represents the same groups as $R_4$, $R_5$ and $R_6$; hydroxy; a polyoxyalkylene group of 2–20 alkylene oxide residues; carboxy or sulfo or phospho ester; carbamoyl; substituted or unsubstituted alkyl-, aryl-aralkyl-, diaryl- or dialkyl-carbamoyl of 1 to about 20 carbon atoms; sulfamoyl; substituted or unsubstituted alkyl-, aryl-, aralkyl-, diaryl- or dialkyl-sulfamoyl of 1 to about 20 carbon atoms; acylamino; sulfonylamino; amino; a substituted or unsubstituted alkyl-, aryl-, aralkyl-, diaryl- or dialkylamino-of 1 to about 20 carbon atoms; or a quaternary ammonium or phosphonium group; or may be combined with $R_2$ to form a carbocyclic or heterocyclic 5 or 6 membered ring;
   m is 1 to 4;
   n is 1 except when Z represents the atoms necessary to complete a nitrogen-containing heterocyclic ring containing 3 nitrogen atoms, in which case n is 0; and
   X represents a counterion;
   with the proviso that when Z represents the atoms necessary to complete a nitrogen-containing heterocyclic ring of 3 nitrogen atoms, then $R_3$ is combined with $R_2$ to form a carbocyclic or heterocyclic 5 or 6 membered ring.

3. The method of claim 2 wherein $R_1$ represents $C_4H_9$.

4. The method of claim 2 wherein $R_2$ and $R_3$ are taken together to represent a tetrahydroquinoline ring.

5. The method of claim 2 wherein $R_4$ and $R_5$ each represent $CH_3$.

6. The method of claim 2 wherein Z represents a triazole or pyrazole ring.

7. The method of claim 2 wherein X represents citrate, gluconate or lactate.

8. The method of claim 2 wherein said humectant is diethylene glycol, glycerol or diethylene glycol monobutylether.

9. The method of claim 2 wherein said dye comprises about 0.2 to about 5% by weight of said ink jet ink composition.

10. The method of claim 1 wherein said anionic polymer is a polyurethane.

11. The method of claim 1 wherein said anionic polymer is a polyester.

12. The method of claim 1 wherein said anionic polymer is a polyolefin.

13. The method of claim 1 wherein said anionic polymer is a vinyl polymer.

14. The process of claim 1 wherein said hydrophilic polymer is gelatin.

15. The process of claim 1 wherein said hydrophilic polymer has the formula:

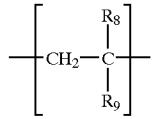

wherein:
   $R_8$ represents hydrogen or an alkyl group having from about 1 to about 6 carbon atoms; and
   $R_9$ represents hydroxyl, pyrrolidone, $NHCOR_{10}$ or $CONHR_{10}$, where $R_{10}$ represents an alkyl group having from about 1 to about 6 carbon atoms.

16. The process of claim 1 wherein the weight ratio of anionic polymer to hydrophilic polymer is from about 1:9 to about 8:2.

17. The process of claim 1 wherein the weight ratio of anionic polymer to hydrophilic polymer is from about 1 to 1.

* * * * *